March 31, 1925.
C. P. WETMORE
EXPANSIBLE REAMER
Filed June 22, 1921
1,531,891
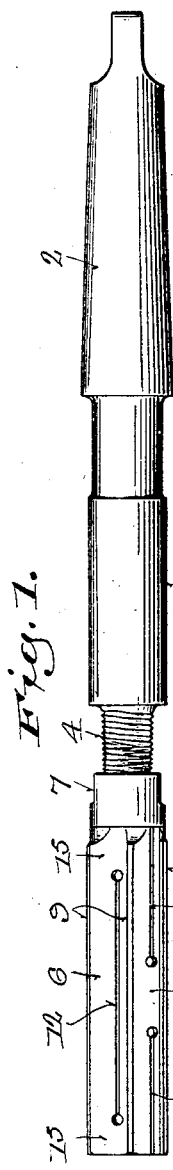
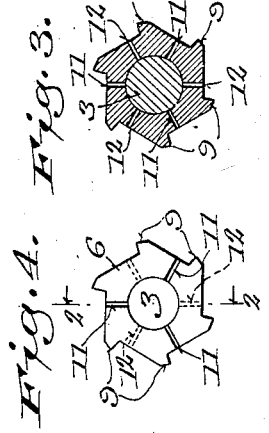
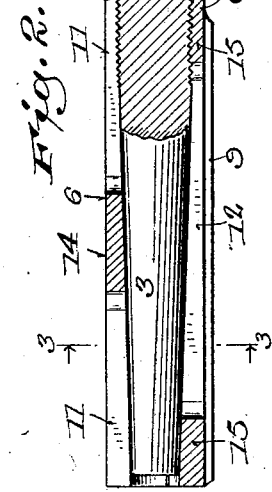
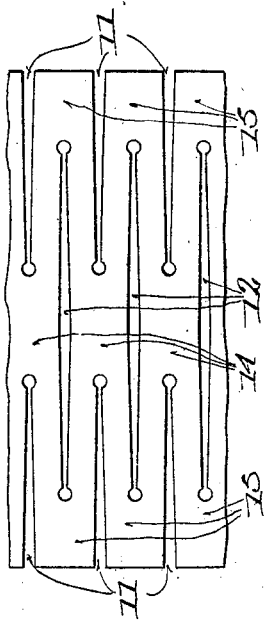
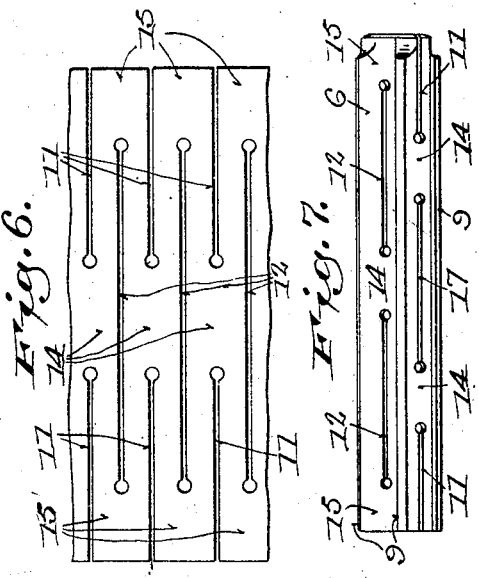
INVENTOR:
Charles P. Wetmore
BY
ATTORNEYS.

Patented Mar. 31, 1925.

1,531,891

UNITED STATES PATENT OFFICE.

CHARLES P. WETMORE, OF MILWAUKEE, WISCONSIN, ASSIGNOR TO WETMORE REAMER COMPANY, OF MILWAUKEE, WISCONSIN, A CORPORATION OF WISCONSIN.

EXPANSIBLE REAMER.

Application filed June 22, 1921. Serial No. 479,428.

*To all whom it may concern:*

Be it known that I, CHARLES P. WETMORE, a citizen of the United States, residing at Milwaukee, in the county of Milwaukee and State of Wisconsin, have invented certain new and useful Improvements in Expansible Reamers, of which the following is a specification, reference being had to the accompanying drawing, forming a part thereof.

This invention relates more particularly to expansible shell reamers.

The main objects of the invention are to provide for uniform expansion of the reamer shell, body or head, and at the same time to maintain sufficient strength and rigidity in the construction of the tool to effectively resist working strains without breaking, twisting or distortion; to provide for the adjustment and locking of the shell on the arbor without increasing the length of the arbor or weakening the arbor or lock nut; to facilitate expansion and adjustment of the shell and securely locking the same on the arbor; and generally to improve the construction and operation of reamers of this type.

It consists in the construction, arrangement and combination of parts as hereinafter particularly described and pointed out in the claims.

In the accompanying drawing like characters designate the same parts in the several figures.

Figure 1 is a side elevation of a reamer embodying the invention; Fig. 2 is an enlarged longitudinal section on the line 2—2, Fig. 4, of the expansible reamer shell, body or head, and a portion of the arbor on which it is mounted; Fig. 3 is a cross section on the line 3—3, Fig. 2; Fig. 4 is a front end elevation of the reamer; Fig. 5 is a developed view of a portion of the slotted shell expanded; Fig. 6 is a similar view of a portion of the shell unexpanded; and Fig. 7 is a side elevation of a shell of slightly modified construction.

Referring to Fig. 1, the reamer comprises an arbor 1, having a shank 2, shaped to fit the mandrel or spindle of any machine with which the reamer is to be used. The arbor is formed as shown in Fig. 2, with a tapered end 3, and between the larger end of the taper and the shank with a cylindrical portion 4, provided with right and left and intersecting screw threads. An expansible shell 6 is formed with a tapered bore fitting the tapered end 3 of the arbor, and at the larger end of the bore is internally threaded to engage one of the screwthreads on the threaded part 4 of the arbor, the right hand thread in case of a right hand reamer.

A lock nut 7, is threaded to engage the other screwthread, the left hand thread in the case of a right hand reamer, on the threaded part 4 of the arbor, and is adapted to engage with the adjacent end of the shell 6 and securely lock it in adjusted position on the arbor. The end of the nut which engages the shell is preferably formed with an internal bevel, and the shell is formed with a corresponding external bevel, so that when the nut is screwed tightly against the shell it tends to contract the internally threaded end thereof and bind it firmly upon the threaded part of the arbor.

The shell is provided with longitudinal blades 9, which may be formed as shown, integrally therewith or separately therefrom, and inserted therein.

The shell is also formed between the blades with longitudinal expansion slots 11 and 12. The slots 11 extend at their opposite outer ends through the ends of the shell and alternate with and overlap the slots 12, which terminate at both ends within the shell, short of its ends. The shell is thus partially divided at intervals around it into longitudinal blade supporting sections, which can be uniformly and evenly separated more or less, to ream bores or holes to the exact size desired and to compensate for wear and sharpening of the blades and thus prolong the life of the shell or blades.

The blade bearing sections of the shell are connected with one another by medial bonds 14, separating the inner ends of the open end slots 11, and by terminal bonds 15 at the outer ends of the closed end slots 12, the bonds being thus disposed in staggered arrangement around the shell, giving strength and rigidity to the shell to effectively prevent breaking, twisting and deflection of the blades under ordinary reaming or working strains, and at the same time admitting of evenly distributed expansion of the shell by its axial adjustment on the tapered end 3 of the arbor.

The number and arrangement of the expansion slots may be varied, the number being increased for reamer shells of greater size or length so as to provide for the desired degree of expansion and at the same time evenly distribute the expansion around and throughout the length of the shell. For example, as shown in Fig. 7, longitudinal series each comprising two slots 11, opening through opposite ends of the shell, and an intermediate closed end slot 17, alternate with and overlap series each comprising two closed end slots 12. By increasing the number of expansion slots in longitudinal series, their length may be reduced for any given length of shell and the number of bonds between them correspondingly increased and distributed, but in every case the slots in each series will overlap the slots in adjacent series, and the bonds between them in the several series will be staggered. Thus, with the arrangement shown in Fig. 7, the slots 11 and 17 overlap the slots 12 of adjacent series, and the medial bonds 14 between the slots 11 and 17 are staggered with relation to the medial bonds 14, and the terminal bonds 15 between and at the outer ends of the slots 12 of adjacent series.

By providing both right and left hand screwthreads on the same portion 4 of the arbor adjacent the tapered end 3, the length of the arbor may be reduced without reducing the diameter of and weakening that part of the arbor on which the shell is threaded, or unduly reducing the thickness of the lock nut 7, which would be the case if the shell and lock nut were threaded on different portions of the arbor, since such threaded portions would have to be of different diameters to allow the lock nut to clear the screwthread for the shell in assembling the parts of the reamers, particularly in the case of small reamers.

The blades are ground and finished primarily to the desired normal diameter of the smallest bore or hole to be reamed, while the slots in the shell are unexpanded, as shown in Fig. 6, and by the adjustment of the shell on the tapered end 3 of the arbor towards its shank, the shell is expanded to compensate for wear and sharpening of the blades or to increase the diameter of the hole or bore to be reamed, the expansion slots being spread, as shown in Fig. 5, by screwing the shell on the right hand thread of the arbor towards the shank.

The spring or resiliency of the metal tending to restore the shell to its initial size, after it has been expanded, it will contract, for reaming holes or bores of smaller diameter, by adjustment on the arbor towards its smaller tapered end 3.

I claim:

1. A reamer shell of the class described provided with two series of slots, the slots of one of said series having their ends terminating within the shell, the slots of the other of said series extending from the ends of said shell and terminating within the same.

2. A reamer shell of the class described provided with a plurality of series of slots, the slots of one of said series having their ends terminating within the shell, the slots of another of said series being arranged in staggered relation to said first-mentioned series whereby adjacent ends of the slots of said series overlap.

3. In a reamer, the combination with an arbor, and a shell threaded thereon and removable therefrom in an axial direction, of means adapted to coact with one end of said shell after the same has been operatively positioned on said arbor to prevent rotation thereof in one direction while permitting rotation thereof in the other direction.

4. In a reamer the combination of an arbor having a portion provided with intersecting right and left hand screwthreads, a shell provided with blades and having a bore fitting the arbor and threaded to engage one of the threads thereof, and a lock nut threaded to engage the other thread of the arbor for locking engagement with the adjacent end of the shell.

5. In a reamer the combination of an arbor having a tapered portion and a portion adjacent the tapered portion provided with intersecting right and left hand screwthreads, an expansible shell provided with blades and having a bore fitting the tapered portion of the arbor and threaded at one end to engage one of the threads of the arbor, and a lock nut threaded to engage the other thread of the arbor.

6. In a reamer the combination of an arbor having a tapered portion and a portion adjacent the larger end of the tapered portion and of somewhat larger diameter provided with right and left hand intersecting screwthreads, an expansible shell provided with blades and having a tapered bore fitting the tapered portion of the arbor and threaded in the larger end of the bore to engage one of the threads of the arbor, and a lock nut threaded on the other thread of the arbor for locking engagement with the adjacent end of the shell.

7. In a reamer, in combination, an arbor having one end thereof tapered and provided with intersecting right and left hand screw threads, a shell fitted to the tapered end of said arbor for adjustment thereon, said shell being provided with internal threads cooperating with one of the threads of said arbor, and a nut arranged for co-operation with the other thread of said arbor and for engagement with said shell to lock said shell in position on said arbor, the engaging surfaces of said shell and said arbor being beveled to effect contraction of said shell upon said arbor, said shell being provided with slots arranged to permit expansion thereof and blades extending longitudinally with respect thereto.

In witness whereof I hereto affix my signature.

CHARLES P. WETMORE.

Certificate of Correction.

It is hereby certified that Letters Patent No. 1,531,891, granted March 31, 1925, upon the application of Charles P. Wetmore, of Milwaukee, Wisconsin, for an improvement in " Expansible Reamers," were erroneously issued to " Wetmore Reamer Company, of Milwaukee, Wisconsin, a Corporation of Wisconsin," as assignee of the entire interest in said invention, whereas said Letters Patent should have been issued to the inventor, said *Charles P. Wetmore*, as sole owner of said invention; and that the said Letters Patent should be read with this correction therein that the same may conform to the record of the case in the Patent Office.

Signed and sealed this 16th day of June, A. D. 1925.

[SEAL.]
KARL FENNING,
*Acting Commissioner of Patents.*